United States Patent [19]

Segré et al.

[11] Patent Number: 4,658,401
[45] Date of Patent: Apr. 14, 1987

[54] THIN FILM PASSIVE RING RESONATOR LASER GYRO

[75] Inventors: Joseph P. Segré, Newton Center; John R. Haavisto, Scituate, both of Mass.

[73] Assignee: Northrop Corporation, Los Angeles, Calif.

[21] Appl. No.: 589,711

[22] Filed: Mar. 15, 1984

[51] Int. Cl.4 .............................................. H01S 3/10
[52] U.S. Cl. ........................................ 372/26; 372/12; 372/94; 372/7; 356/350
[58] Field of Search ....................... 372/94, 93, 7, 9, 12, 372/13, 26; 356/350

[56] References Cited

U.S. PATENT DOCUMENTS 4,135,822  1/1979  Ezekiel ................................ 356/350
4,273,444  6/1981  Pool et al. .......................... 356/350
4,514,088  4/1985  Coccoli ............................... 356/350

Primary Examiner—Leon Scott, Jr.
Attorney, Agent, or Firm—Kenway & Jenney

[57] ABSTRACT

Passive ring resonator laser gyro in which the clockwise and counterclockwise beams do not coexist in the resonator. The laser gyro employs thin film technology. In particular, the preferred laser is a gallium aluminum arsenide laser. Light from the laser is phase-modulated by means of a thin film electro-optic modulator comprising a channel waveguide disposed on an electrically active material and flanked by electrodes for modulating the phase of light from the laser. An electro-optic switch is provided for switching light from the laser to inject alternatingly clockwise and counterclockwise beams into the resonator. The resulting gyro is extremely compact and simply implemented into an integrated, thin film package. Because the clockwise and counterclockwise beams do not coexist in the resonator, various beam interaction effects such as beats, backscatter and feedback into the laser are eliminated.

8 Claims, 6 Drawing Figures

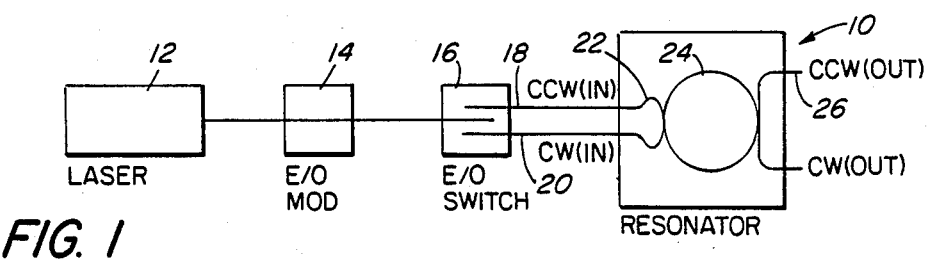
FIG. 1
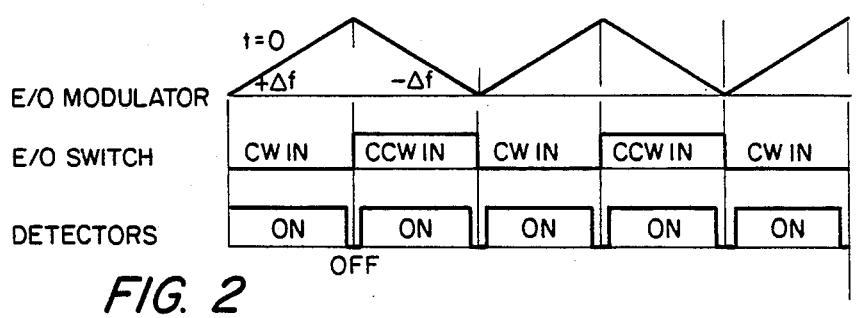
FIG. 2
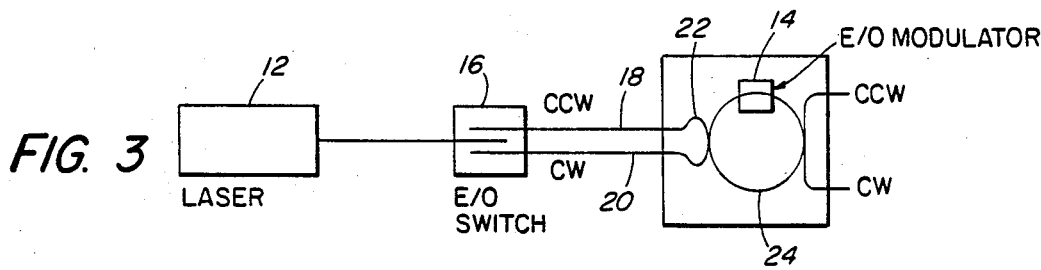
FIG. 3
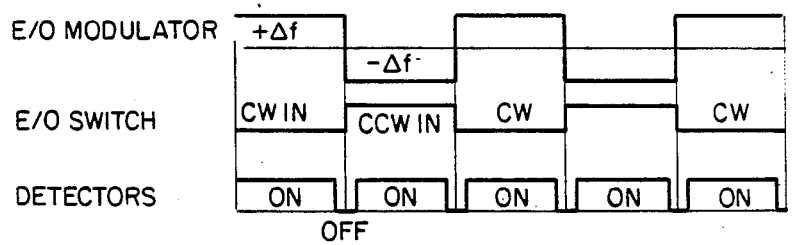
FIG. 4
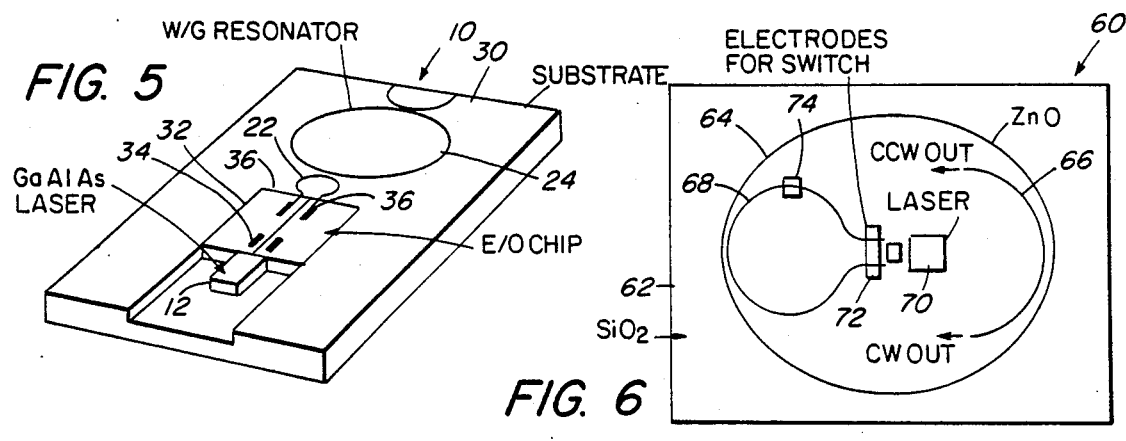
FIG. 5
FIG. 6

4,658,401

THIN FILM PASSIVE RING RESONATOR LASER GYRO

BACKGROUND OF THE INVENTION

This invention relates to laser gyroscopes and more particularly to a laser gyroscope employing thin film technology in which the clockwise and counterclockwise beams do not coexist in the resonator.

Laser gyroscopes operate by propagating clockwise and counterclockwise beams of light into a resonator. If the resonator has an angular velocity in the plane of the resonator, the apparent path length for one of the beams will be longer than that of the counter propagating beam. Therefore, the resonance conditions for the two beams are no longer the same. In order to bring both beams back into resonance, biasing must be provided to compensate for the apparent change in path length both in the clockwise and counterclockwise directions.

When both the clockwise and counterclockwise beams exist simultaneously in the resonator, various detrimental interaction effects may result such as beats, backscatter and feedback into the laser. These interactions degrade the performance of such a laser gyroscope.

It is therefore an object of this invention to provide a passive ring resonator laser gyroscope which substantially eliminates interaction effects such as beats, backscatter and feedback into the laser.

Yet another object of this invention is a laser gyroscope utilizing thin film technology to produce a gyroscope which is extremely compact, reliable and easy to manufacture.

SUMMARY OF THE INVENTION

These and other objects of the invention are achieved by means of a laser gyroscope including a solid state laser and a thin film passive ring resonator. A thin film delivery loop waveguide is provided which is evanescently coupled to the resonator for delivering light from the laser into the resonator. An electro-optic switch of thin film construction alternatingly injects a beam of light from the laser in a clockwise and a counterclockwise direction into the delivery loop. Also provided is an electro-optic modulator of thin film construction for modulating the phase of light from the laser so as to maintain the clockwise and counterclockwise beams on resonance independently.

In one embodiment, the electro-optic modulator is disposed between the laser and the electro-optic switch. In another embodiment, the electro-optic modulator is disposed in the passive ring resonator itself. In these embodiments, the electro-optic modulator includes a channel waveguide disposed on an electrically active material and flanked by electrodes for modulating the phase of light from the laser. The electro-optic switch also includes a channel waveguide disposed on electrically active material and flanked by electrodes adapted for switching light from the laser so as to inject alternatingly clockwise and counterclockwise beams into the delivery loop. The preferred electrically active material is titanium diffused $LiNbO_3$. The preferred solid state laser is galium aluminum arsenide. The passive ring resonator is preferably a low loss electro-optic waveguide made of zinc oxide and mounted on a substrate made of glass, thermally oxidized silicon or quartz. Doped plexiglas on a quartz substrate can also be used.

BRIEF DESCRIPTION OF THE DRAWING

The invention disclosed herein will be better understood with reference to the drawing of which:

FIG. 1 is a schematic representation of the laser gyro in which the electro-optic modulator is located between the laser and the electro-optic switch;

FIG. 2 is a graph illustrating the various states of the electro-optic modulator and the electro-optic switch;

FIG. 3 is a schematic representation of a laser gyro in which the electro-optic modulator is included within the resonator itself;

FIG. 4 is a graph illustrating the states of the electro-optic modulator and electro-optic switch for use with the embodiment of FIG. 3;

FIG. 5 is a perspective view of the thin film laser gyroscope disclosed herein; and FIG. 6 is a schematic view of another embodiment of the invention disclosed herein.

DESCRIPTION OF THE PREFERRED EMBODIMENTS

With reference first to FIG. 1, a laser gyroscope 10 includes a solid state gallium aluminum arsenide semiconductor laser 12 which generates monochromatic light. Light from the laser 12 passes through a thin film electro-optic modulator 14 which provides frequency shifting in the light beam by a linear change in phase with time. The modulated light beam then passes into a thin film electro-optic switch 16. The electro-optic switch 16 steers the beam alternatingly into an upper branch 18 and a lower branch 20 of a delivery loop 22. The delivery loop 22 is positioned near a passive ring resonator 24 so that the delivery loop 22 and the passive ring 24 are evanescently coupled. An output loop 26 is also evanescently coupled with the passive ring resonator 24. The output loop 26 is connected to detectors (not shown) for responding to the frequencies of the clockwise and counterclockwise beams. When the laser gyroscope 10 has an angular velocity, the path length within the resonator 24 appears longer to one of the beams than it does to the counter-propagating beam. In order to maintain each of the beams independently on resonance, the frequencies of the clockwise and counterclockwise beams must be shifted by an equal and opposite amount in order to maintain the resonance condition. The frequency shift required to maintain resonance is proportional to the rotation rate.

FIG. 2 illustrates the phase shift waveforms necessary to maintain the resonance condition. The upper curve in FIG. 2 represents the voltage signal applied to the electro-optic modulator 14. It should be noted that the electro-optic modulator 14 is synchronized with the electro-optic switch 16 so that the clockwise and counterclockwise beams do not coexist in the resonator 24. In particular, at t=0, the clockwise beam is injected into the resonator 24 and the electro-optic modulator 14 provides a frequency shift of $+\Delta F$. $\Delta F$ is the frequency shift required to maintain resonance. At time $t=\tau$, the counterclockwise beam is injected into the resonator and simultaneously the electro-optic modulator shifts the frequency as indicated by $-\Delta F$ in FIG. 2. After another interval of seconds, the clockwise beam is injected and the electro-optic modulator 14 is suitably switched. This alternation continues repeatedly. As shown in the lower portion of FIG. 2, the frequency detectors (not shown) are maintained on except for short intervals around the switching time so as to avoid switching transients.

In operation, as the laser gyro 10 rotates, the frequency detectors (not shown) connected to the output loop 26 will detect frequency shifts away from resonance. The shifts are then used as inputs to the electro-optic modulator 14 to provide the appropriate frequency shifts to maintain both the clockwise and counterclockwise beams on resonance. As stated above, the frequency shift is proportional to the angular rate of the gyro 10 which is the quantity to be detected. As shown in FIG. 2, the injection of the clockwise and counterclockwise beams is alternated so that the counter-propagating beams are temporally isolated from one another. This temporal isolation eliminates detrimental interaction effects such as beats, backscatter and feedback into the laser 12.

FIG. 3 illustrates another embodiment of this invention. In this embodiment, the electro-optic modulator 14 is a phase modulator and is disposed within the passive ring resonator waveguide 24 itself rather than between the laser 12 and the electro-optic switch 16 as in the case of the embodiment of FIG. 1. FIG. 4 shows the various waveforms suitable for use with the embodiment of FIG. 3. As before, the clockwise and counterclockwise beams are alternated in synchronism with the electro-optic modulator. In this case, however, the voltage signals applied to the modulator 14 are constants rather than varying linearly with time as shown in FIG. 2. Thus the modulator 14 will alter the apparent path length of the resonator 24 to maintain resonance. Also, as before, the frequency detectors (not shown) are on except for short intervals around the switching times to avoid switching transients.

A physical implementation of the laser gyro 10 as illustrated in the embodiment of FIG. 1 is shown in FIG. 5. The laser gyroscope 10 is created on a substrate 30, preferably quartz. The gallium aluminum arsenide semiconductor laser is coupled into a channel waveguide 32 on an electrically active material such as titanium diffused lithium niobate. A pair of electrodes 34 flank the channel waveguide 32. The phase in the waveguide 32 is controlled by an electric field in the waveguide region generated by varying the voltages between the electrodes 34. The waveguide 32 next passes through a second set of electrodes 36 also having electro-optic properties such that the beam can be steered into the upper branch 18 or the lower branch 20 (FIG. 1) of the delivery loop 22 depending on the voltage between the electrodes 36. Light traveling in the delivery loop 22 is evanescently coupled into the passive ring resonator 24. The waveguide resonator 24 is preferably made of a doped plexiglas.

An alternative embodiment is shown in FIG. 6. A laser gyroscope 60 includes a silicon dioxide substrate 62 on which the other components are mounted using thin film technology. The various waveguides on the substrate 62 are preferably made of a low loss electro-optic material such as zinc oxide. In particular, a resonator 64 is disposed on the substrate 62. An output waveguide loop 66 is evanescently coupled to the resonator loop 64. A delivery loop 68 is also located inside the resonator loop 64. As with the embodiment of FIG. 5, a laser 70 delivers either a clockwise or a counterclockwise beam of light into the delivery loop 68 depending on the state of a switch 72. An electro-optic modulator 74 is placed within the delivery loop. Alternatively, the modulator could be placed in the resonator loop 64 itself. Since the sensitivity of a laser gyroscope such as that designated 60 in FIG. 6, increases with the perimeter of the resonator loop, this embodiment allows for a larger perimeter in a relatively small package since the other components are located within the loop.

It is thus seen that the objects of this invention have been achieved in that there has been disclosed a laser gyroscope capable of detecting rotations which is based on thin film technology. This gyroscope is thus extremely compact and easy to manufacture. Furthermore, by means of an electro-optic switch, the clockwise and counterclockwise beams are introduced into the resonator in an alternating fashion so that the beams never coexist. This temporal isolation of the beams thus eliminates detrimental beam interaction effects known in conventional laser gyroscopes. The thin film construction also results in high reliability.

It is recognized that modifications and variations of this invention will occur to those skilled in the art and it is intended that all such modifications and variations be included with the scope of the following claims.

What is claimed is:

1. Thin film laser gyro comprising:
    a solid state laser;
    a thin film passive ring resonator;
    a thin film delivery loop waveguide means evanescently coupled to said resonator to deliver light from said laser into said resonator;
    a thin film electro-optic switch means to alternatingly inject a clockwise and a counterclockwise beam of light from said laser into said delivery loop; and
    a thin film electro-optic modulator means to modulate the phase of light from said laser to maintain said clockwise and said counterclockwise beams on resonance independently wherein said electro-optic modulator means comprises a channel waveguide of an electro-optic material with electrodes for modulating the phase of light from said laser.

2. The apparatus of claim 1 wherein said electrically active material is titanium diffused $LiNbO_3$.

3. The apparatus of claim 1 wherein said electro-optic material is zinc oxide.

4. Thin film laser gyro comprising:
    a solid state laser;
    a thin film passive ring resonator;
    a thin film delivery loop waveguide means evanescently coupled to said resonator to deliver light from said laser into said resonator;
    a thin film electro-optic switch means to alternatingly inject a clockwise and a counterclockwise beam of light from said laser into said delivery loop; and
    a thin film electro-optic modulator means to modulate the phase of light from said laser to maintain said clockwise and said counterclockwise beams on resonance independently wherein said electro-optic switch comprises a channel waveguide disposed on electrically active material and flanked by electrodes for switching light from said laser to inject alternatingly clockwise and counterclockwise beams into said delivery loop.

5. The apparatus of claim 4 wherein said electrically active material is titanium diffused $LiNbO_3$.

6. Thin film laser gyro comprising:
    a solid state laser;
    a thin film passive ring resonator;
    a thin film delivery loop waveguide means evanescently coupled to said resonator to deliver light from said laser into said resonator;

a thin film electro-optic switch means to alternatingly inject a clockwise and a counterclockwise beam of light from said laser into said delivery loop; and a thin film electro-optic modulator means to modulate the phase of light from said laser to maintain said clockwise and said counterclockwise beams on resonance independently wherein said laser is GaAIAs.

7. Thin film laser gyro comprising:

a solid state laser;

a thin film passive ring resonator;

a thin film delivery loop waveguide means evanescently coupled to said resonator to deliver light from said laser into said resonator;

a thin film electro-optic switch means to alternatingly inject a clockwise and a counterclockwise beam of light from said laser into said delivery loop; and a thin film electro-optic modulator means to modulate the phase of light from said laser to maintain said clockwise and said counterclockwise beams on resonance independently wherein said passive ring resonator is doped plexiglas disposed on a quartz substrate.

8. Thin film laser gyro comprising:

a solid state gallium aluminum arsenide laser;

a thin film passive ring resonator;

a thin film delivery loop waveguide means evanescently coupled to said resonator to deliver light from said laser into said resonator;

a thin film electro-optic switch means to alternatingly inject a clockwise and a counterclockwise beam of light from said laser into said delivery loop, said electro-optic switch comprising a channel waveguide disposed on electrically active material and flanked by electrode means for switching light from said laser;

and a thin film electro-optic modulator means to modulate the phase of light from said laser to maintain said clockwise and said counterclockwise beams on resonance independently, said electro-optic modulator comprising a channel waveguide disposed on an electrically active material and flanked by electrode means to modulate the phase of light from said laser.

* * * * *